United States Patent
Harnish et al.

[15] 3,678,143
[45] July 18, 1972

[54] USE OF REFRACTORY PARTING LAYER TO AID SKULL REMOVAL FROM FURNACE LININGS

[72] Inventors: Mark E. Harnish; Merrit A. Peters, both of Plymouth Meeting, Pa.

[73] Assignee: International Minerals & Chemical Corporation

[22] Filed: Nov. 25, 1970

[21] Appl. No.: 92,870

[52] U.S. Cl. ............................ 264/30, 106/59, 117/123 B, 266/43
[51] Int. Cl. ............................ F27d 1/16, C04b 35/12
[58] Field of Search ............ 264/30; 106/59; 266/43; 117/123 A, 123 B

[56] References Cited

UNITED STATES PATENTS

| | | | |
|---|---|---|---|
| 2,517,790 | 8/1950 | Hughey | 264/30 |
| 2,946,703 | 7/1960 | Thompson | 266/43 |
| 3,427,369 | 2/1969 | Parsons | 264/30 |
| 3,232,774 | 2/1966 | Kehl | 264/30 |
| 3,333,840 | 8/1967 | Weaver et al. | 264/30 |
| 3,467,542 | 9/1969 | Nordlie | 264/30 |
| 3,603,050 | 9/1971 | Coleman | 266/43 |

FOREIGN PATENTS OR APPLICATIONS 1,006,283 9/1965 Great Britain ..................... 264/30

OTHER PUBLICATIONS

M. W. Demler, "Basic Refractories For Cupola Service," 1952 A.F.S. Annual Meeting- Preprint No. 52-20

Primary Examiner—Julius Frome
Assistant Examiner—John H. Miller
Attorney—James E. Wolber

[57] ABSTRACT

Refractory linings of metallurgical vessels, such as a tundish lined with alumina brick, are protected from the destructive effects of molten metal, skull, and skull removal by applying a coating of special refractory parting composition to the metal-contacting interior surfaces of the refractory lining. The coating is applied after skull removal and prior to returning the vessel to service. The special refractory parting composition consisting of a mixture of chrome ore, periclase, and a magnesium salt, and the particle size distribution are compounded to adhere to the solidified metal of the skull, to be non-adherent to the refractory lining, and to crumble on skull removal to the extent necessary to prevent injury to the refractory lining.

12 Claims, No Drawings

USE OF REFRACTORY PARTING LAYER TO AID SKULL REMOVAL FROM FURNACE LININGS

BACKGROUND OF THE INVENTION

Refractory lined metallurgical vessels such as ladles or tundishes are subject to skulling. Heat transfer, which always occurs to some extent through the refractory lining of such vessels, results in gradual chilling and solidification of a layer of metal adjacent the refractory surface. Eventually a solidified metal skull builds up to a point where it is necessary to take the vessel out of service to remove the skull. Because the interior surfaces of the refractory lining of the vessel are always to some extent uneven, and because cracks and fissures develop in the refractory lining, skull removal has been attended by considerable damage to the refractory lining. Molten metal finds its way into cracks and fissures in the lining. Chunks of refractory are commonly broken and removed with the skull. Moreover, sliding of the uneven surface of the skull across the uneven surface of the refractory lining results in abrasion and breakage of the refractories. The result is that the refractory lining employed in a vessel such as a tundish must ordinarily be replaced after seven to 10 skull removing operations. Such refractory linings are commonly fabricated of alumina or other acidic brick, but may also be made from other refractory materials, either bricks or as a monolithic lining.

Mixtures of periclase and chrome ore have long been employed in the manufacture of refractories, both in the form of refractory aggregates and brick. Exemplary of such refractory products is the refractory brick described in U.S. Pat. No. 2,394,304 to Griffith. The refractory brick of that patent consists of 50 to 75 parts by weight chrome ore, 25 to 50 parts by weight periclase, and 5 to 12½ parts by weight of iron oxide. Additional ingredients are optionally included and the appropriately sized constituents are pressed into a brick and fired to form the finished refractory.

DESCRIPTION OF THE INVENTION

In accordance with this invention a method is provided for protecting the refractory lining of metallurgical vessels from the destructive effects of skulling and skull removal by applying to the molten-metal-adjacent interior surfaces of the refractory lining a thin layer of a special refractory parting composition. The layer is applied by conventional means such as trowelling, gunning or brushing in place while the vessel is at room temperature, but can be applied at a slightly elevated temperature, commonly in the range of 225° to 300°F. A thin parting layer, which may be one-fourth to 1 inch in thickness, and preferably is about one-half inch in thickness, is applied uniformly to the interior surfaces of the refractory lining. The special refractory parting composition must be capable of application at slightly elevated temperatures; must be sufficiently adherent to remain in place without slumping until it hardens; and must be capable of setting without blistering as the vessel is heated prior to returning it to service. Moreover, the special parting composition must set up to sufficient strength so that it will withstand the pouring of metal into the vessel. It must be non-bonding to the refractory lining of the vessel throughout the temperature range at which it will be employed, namely, 225° to about 3,000°F., but should bond securely to the solidified skull at skull-forming temperatures. Moreover, the special parting composition must crumble freely during skull removal to provide minimum abrasion against, and damage to, the refractory lining.

It has been found that all of the foregoing criteria can be met by employing as the refractory parting composition an aqueous mortar comprising a mixture of a dry aggregate and about 10 to about 20 parts by weight of water per 100 parts of dry ingredients. The dry aggregate comprises (a) a first grog portion which is −4 +50 mesh and provides at least 45 percent, and preferably 50 percent, by weight of said dry aggregate; (b) an intermediate fraction which is −50 +100 mesh and comprises 2 to 10 percent by weight of said dry aggregate; and (c) a fines fraction which is −100 mesh and comprises at least 40 percent, and preferably 45 percent, by weight of said dry aggregate. It will be understood that Bureau of Standard mesh sizes are intended throughout this specification wherever mesh size is specified.

The grog, intermediate, and fine fractions consist essentially of chrome ore, periclase, or mixtures of chrome ore and periclase. The grog and fines fractions are further characterized in meeting one of two conditions, viz, (1) the grog fraction contains chromite ore in the amount of at least 40 percent by weight of the total dry aggregate and the fines fraction contains periclase (calculated as MgO) in the amount of at least 20 percent by weight of the total dry aggregate; or (2) said grog fraction contains periclase (calculated as MgO) in the amount of at least 25 percent by weight of said total dry aggregate and said fines fraction contains chromite ore in the amount of at least 35 percent by weight of said total dry aggregate.

The aggregate will further include a magnesium sulfate salt in the amount of about 2 to 6 percent, preferably about 4 percent. The aggregate also preferably includes a clay, especially bentonite, in the amount of one-half to 3 percent, more preferably about 1 percent by weight, and a plasticizing agent such as methylcellulose in the amount of 0.1 to 0.5 percent, but more preferably in the amount of 0.2 percent by weight. All of the foregoing percentages are by weight of the aforementioned dry aggregate. The mixture should be substantially free of non-chromite form iron.

It has been found that the mixture of chromite and periclase, when appropriately sized, provides a basic refractory parting composition admirably suited to the process of this invention. The addition of a magnesium sulfate salt imparts to the composition the desired rigidity and internal strength at temperatures intermediate to the temperatures of application and the final temperature of the vessel prior to metal pouring. The incorporation of bentonite and a plasticizing agent in the described amounts imparts the desired trowelling characteristics to the mixture. The sizing of the grog and fines constituents has been found essential to providing appropriate strength characteristic to the parting composition at steel pouring temperatures and to prevent blistering of the coating during heat-up in the vessel.

In a preferred embodiment of this invention the fines fraction consists essentially of ground chromite ore, and the grog fraction consists essentially of periclase grain and chrome ore. In a still more highly preferred embodiment the grog fraction is a ground reconstituted periclase-chromite composition prepared by crushing a fired refractory body. For example, fired refractory bodies composed of 60 parts periclase of 98% MgO content and 40 parts Transvaal chrome ore are crushed and screened to produce a grog. This grog contains essentially 60 percent periclase calculated as MgO and provides an MgO content in the amount of nearly 30 percent based upon the weight of the total dry aggregate when the grog comprises 50 percent by weight of the total dry aggregate.

In a less preferred embodiment of the invention the grog fraction may consist of sized chromite ore and the fines fraction may consist of ground periclase. This periclase is again preferably in the form of a reconstituted magnesite-chrome material produced by grinding fired periclase-chromite bodies. The proportion of periclase to chromite ore in the ground body and the quantity of the fines fraction are adjusted so that the fine periclase comprises at least 20 percent, and more preferably about 30 percent, by weight of the total dry aggregate.

A number of chrome ores have been found suitable for use in the practice of this invention. The chrome ores (with or without reconstituted chromite) are employed in the amount of at least 45 percent of the total dry constituents of the parting composition, and more preferably in the amount of about 60 to 65 percent by weight of the dry constituents. Exemplary chrome ores suitable for use in the practice of this invention are shown in Table 1. Other ores are also suitable.

The amount of iron in the chrome ore is not critical. Such iron typically exists in the form of chromite, as a spinel-type compound. By "chromite form" it is meant that the iron is in the form expressed by $R''O\,R_2'''O_3$, in which $R'''$ is $Cr^{+++}$, $Al^{+++}$, or $Fe^{+++}$ and $R''$ is $Mg^{++}$ or $Fe^{++}$. Included is the coordination of ferrous and ferric oxides. The iron content of the compositions of this invention should be substantially entirely in the spinel-type crystalline structure. By this it is meant that the composition of this invention should contain less than about 2 percent by weight FeO or $Fe_2O_3$ (calculated as $Fe_2O_3$) that is not spinel-type structure. Thus, the iron is present in the chromite spinel phase or it may also in part be present in the spinel, magnesia ferrite phase that is often associated with periclase, or other solid solutions which may exist among the spinel phases. Thus the chrome ore and periclase should be sufficiently low in such iron so that the final composition will contain iron substantially only as the spinel-type form, as defined.

when the vessel is at a temperature of 225°–300°F. However, application at room temperature is sometimes preferred. After applying a coating of the parting composition in accordance with this invention, the coating will be dried in place by application of heat, for example, flame heating the interior of the vessel to a temperature of about 2,000° or 2,500°F. Heating may be very rapid, as rapid as 150°F. per minute without deleterious effect. The vessel is now ready to replace in service, i.e., metal may now be poured into the vessel.

When skull has built up to the point at which a vessel, such as a tundish, is removed from service, the skull is removed in the usual manner. The skull separates readily from the vessel with most of the parting composition of this invention adhering to the skull and leaving the vessel with the skull. Due to surface irregularities a portion of the parting composition will crumble and remain in the vessel as particulate matter. Large particles should be removed before a new coat of parting composition is applied.

TABLE 1

| | Cuban | | Philippine, Masinloc | Transvaal | Rhodesian Selukwe | Grootboom |
|---|---|---|---|---|---|---|
| | Camaguey | Moa Bay | | | | |
| $Cr_2O_3$ | 31.4 | 34.7 | 32.5 | 44.0 | 49.6 | 40.0 |
| $Al_2O_3$ | 29.1 | 27.9 | 29.8 | 15.5 | 12.8 | 14.1 |
| FeO | 13.4 | 14.1 | 13.0 | 24.5 | 13.9 | 24.0 |
| MgO | 18.3 | 17.1 | 18.1 | 10.8 | 13.1 | 11.0 |
| CaO | 0.8 | 0.5 | 0.6 | 0.2 | 1.2 | 0.6 |
| $SiO_2$ | 5.4 | 4.9 | 5.1 | 3.5 | 6.8 | 6.1 |
| Ign. loss | 1.5 | 0.9 | 0.5 | | 2.2 | |
| $Cr_2O_3/Al_2O_3$ | 1.08 | 1.24 | 1.10 | 2.84 | 3.87 | 2.84 |
| Cr/Fe | 2.1 | 2.2 | 2.2 | 1.6 | 3.1 | 1.5 |

All of the foregoing chrome ores are satisfactory for the purposes of this invention. The chrome ore will contain not more than about 8 percent silica, and lower contents such as 2 percent silica are desirable.

The periclase preferred is relatively pure and dead-burned to the point at which no residual shrinkage remains. Preferably it should contain less than about 5% $SiO_2$, may contain minor amounts of $Al_2O_3$, CaO, and $Fe_2O_3$, but the MgO content of the periclase, calculated as MgO, should be at least 85 percent, and preferably at least 93 percent, with the $Fe_2O_3$ being less than 5 percent, and preferable less than 2 percent. The parting composition will contain at least 20 percent periclase (calculated as MgO). The composition of this invention will ordinarily contain periclase in an amount substantially in excess of 20 percent by weight of the dry composition, usually in the total amount of about 30 to 40 percent by weight periclase, again calculated as MgO. However, the periclase in excess of that required to provide an MgO content of 20 percent of the dry weight of the total aggregate is not essential.

The periclase may be virgin periclase grain or, as a preferred alternative, reconstituted periclase obtained by grinding fired chromite-periclase bodies. In the latter case, the periclase employed in fabricating the bodies should meet the hereinbefore described criteria. The ground bodies will of course contain less than 85% MgO because of their chromite content.

Any of the various forms of magnesium sulfate may be employed to provide the magnesium sulfate salt constituent of the mixture. Epsom salt is however preferred.

The dry constituents of the mixture are most conveniently transported and handled as a dry mix until they are to be used. The dry constituents are then mixed with water in the amount of 10 to 20 percent by weight of the dry constituents, preferably about 12 percent by weight of the dry constituents, to provide a thick mortar. In the practice of this invention the mortar is applied to the interior refractory surface of the vessel lining. This can be accomplished in any desired manner, but it is usually most convenient to trowel the composition in place as a thin layer one-fourth to 1 inch, and more preferably one-half inch in average thickness. The vessel need not be cooled to ambient temperature before relining. The parting composition may be applied immediately after skull removal,

EXAMPLE I.

As a specific example of the method of this invention a dry aggregate is prepared using 50 parts by weight of Grootboom chrome ore having the analysis shown in Table 1. The ore is in the form of a grog which is substantially 100 percent −5 mesh and 98 percent +100 mesh, about 94 percent of the grog being +50 mesh. The periclase constituent is prepared from fired bodies which contain periclase and some chrome ore and are ground to substantially 100 percent −100 mesh. The periclase is incorporated in the amount of 44.8 percent by weight. Epsom salt in the amount of 4 percent, bentonite in the amount of 1 percent, and methylcellulose in the amount of 0.2 percent is added and the total is mixed together to form a uniform aggregate. The approximate chemical and screen analyses of the dry mix are as follows:

Chemical Analyses

| | % |
|---|---|
| MgO | 36.0 |
| $Cr_2O_3$ | 26.0 |
| $Fe_2O_3$ | 18.0 |
| $Al_2O_3$ | 10.0 |
| $SiO_2$ | 7.0 |
| CaO | 0.7 |
| $SO_3$ | 1.3 |
| LOI | 1.3 |

Screen Analyses

| | |
|---|---|
| Total on 5 mesh | 0.0 |
| Total on 10 mesh | 26.0 |
| Total on 20 mesh | 41.0 |
| Total on 100 mesh | 54.0 |
| Minus 200 mesh | 37.0 |

EXAMPLE II.

As a second example the mixing procedure of Example I is again carried out except that the chrome ore is employed in the amount of 70 percent and periclase (94 percent −100 mesh) in the amount of 24.8 percent. The Epsom salt, bentonite, and methylcellulose were incorporated in the amounts heretofore stated and a uniform aggregate prepared by conventional mixing.

The dry mixes of Examples I and II were both tested by preparing a mortar consisting of 100 parts by weight of the dry mix and about 12 parts by weight of water. The resulting mortars were of a heavy consistency. These mortars were applied to tundishes lined with alumina refractory brick. Application was made while the tundishes were at a temperature of about 250°F. In each case a coating having a thickness of about one-half inch was uniformly applied to all of the tundish surfaces normally in contact with metal. The mortar spread uniformly and without slumping. The tundishes were then heated by internal flame to raise the temperature of the refractory and coating to about 2,000°F. The tundishes were restored to service and molten steel poured into them. The tundishes remained in service until skull build-up required service be discontinued for skull removal. In each case the skull pulled easily and without damage to the refractory lining of the vessels. Most of the parting composition in each case remained adherent to the skull and was removed therewith. In application, the parting composition did not crack or blister prior to the time metal was poured in the tundishes.

EXAMPLE III

As a third and preferred example of this invention a dry aggregate was prepared using 50 parts by weight of crushed and sized fired bodies which consist essentially of about 60 percent periclase and about 40 percent Transvaal chrome ore, the MgO content of the periclase being about 98 percent. The bodies were crushed and sized to a grog having the following screen analysis:

| | |
|---|---|
| 0% | +4 mesh |
| 53% | +10 mesh |
| 81% | +20 mesh |
| 94% | +60 mesh |
| 98% | +100 mesh |

To this grog was added Transvaal chrome ore ground to the following mesh size:

| | |
|---|---|
| 5% | +100 mesh |
| 23% | +200 mesh |
| 72% | −200 mesh |

Thus, it will be seen that the admixture of grog and fines provides an aggregate of which 45 parts are −4 +50 mesh, 42.5 parts are −100 mesh, and 7.5 parts are in the intermediate −50 +100 mesh size range.

To the foregoing periclase-chrome ore admixture was added Epsom salts in the amount of 4 parts; bentonite in the amount of 1 part; and Methocel in the amount of 0.2 parts. The aggregate thus formulated was found to be less than 1 percent +5 mesh, about 25 percent +10 mesh, about 50 percent +100 mesh, and about 40 percent −200 mesh. The chemical analysis of the aggregate was as follows:

| | |
|---|---|
| MgO | 39.0 |
| $Cr_2O_3$ | 28.0 |
| $Fe_2O_3$ | 18.0 |
| $Al_2O_3$ | 10.0 |
| $SiO_2$ | 2.6 |
| CaO | 0.7 |
| $SO_3$ | 1.3 |
| LOI | 1.3 |

The foregoing aggregate has been found to provide an excellent parting composition. It is outstanding in displaying an unusual latitude of water tolerance in that good results are obtainable when as little as 10 percent to as much as 20 percent by weight of water is admixed therewith to form a trowelable composition.

It has been found that when a tundish is protected by the application of a parting composition in accordance with this invention, the life of the refractory lining is extended from the normal 7 to 10 skull removing operations to as high as 70 skull removing operations.

What is claimed is:

1. The method of protecting a refractory lining of a metallurgical vessel for retaining a molten metal from the deleterious effects of skulling and skull removal comprising applying to the molten metal-adjacent interior surface of said refractory lining a thin coating of a refractory parting composition comprising a mixture of dry aggregate and about 10 to 20 percent by weight of water based on the weight of the dry aggregate, said dry aggregate comprising:
   a. a first grog portion which is −4 +50 mesh and comprises at least 45 percent by weight of said dry aggregate;
   b. an intermediate fraction which is −50 +100 mesh and comprises 2 to 10 percent by weight of said dry aggregate;
   c. a fines fraction which is −100 mesh and comprises at least 40 percent by weight of said dry aggregate; and
   d. a magnesium salt in the amount of 2 to 6 percent by weight of said dry aggregate;

said grog, intermediate and fines fractions consisting essentially of materials of the group consisting of chrome ore, periclase, and mixtures thereof, with said grog and fines fractions being further characterized in meeting one of two conditions, viz,
   i. said grog fraction contains chromite ore in the amount of at least 40 percent by weight of said dry aggregate and said fines fractions contain periclase (calculated as MgO) in the amount of at least 20 percent by weight of said dry aggregate; or
   ii. said grog fraction contains periclase (calculated as MgO) in the amount of at least 25 percent by weight of said dry aggregate and said fines fractions contain chromite ore in the amount of at least 35 percent by weight of said dry aggregate;

said periclase being of at least 85% MgO content and the iron content of said aggregate being substantially entirely chromite form; and applying heat to dry the coating.

2. The method in accordance with claim 1 in which said coating is applied to a thickness of about one-fourth to 1 inch.

3. The method in accordance with claim 1 in which the grog fraction consists essentially of chromite ore and the fines fraction consists essentially of crushed periclase-chromite fired bodies.

4. The method in accordance with claim 1 in which the grog fraction consists essentially of crushed periclase-chromite fired bodies and the fines fraction consists essentially of sized chromite ore.

5. The method in accordance with claim 2 in which said coating is applied when the refractory lining is at a temperature of about 225° to about 300° F.

6. The method in accordance with claim 5 in which said dry mixture includes bentonite in the amount of about one-half to 3 percent by weight of the dry mix.

7. The method in accordance with claim 6 in which said dry mix includes methylcellulose in the amount of about 0.1 to 0.5 percent by weight of the dry mix.

8. The method in accordance with claim 7 in which said periclase contains at least 93 percent by weight MgO.

9. The method in accordance with claim 8 in which said periclase is all substantially −100 mesh.

10. The method in accordance with claim 9 in which said sulfate salt is Epsom salt and is present in the amount of about 3 to 4 percent by weight of the dry mixture.

11. The method in accordance with claim 10 in which said bentonite is present in the amount of about 1 percent of the dry aggregate.

12. The method in accordance with claim 11 in which said methylcellulose is present in the amount of about 0.2 percent by weight of the dry aggregate.

* * * * *